(12) United States Patent
Ichikawa et al.

(10) Patent No.: US 9,855,958 B2
(45) Date of Patent: Jan. 2, 2018

(54) VEHICLE THAT SWITCHES BETWEEN DISPLAYING FUEL EFFICIENCY ON A DISPLAY DEVICE AND DISPLAYING ELECTRICITY EFFICIENCY ON THE DISPLAY DEVICE BASED ON ENGINE USE HISTORY WHEN A SELECTED RUNNING MODE IS A CHARGE DEPLETING MODE

(71) Applicant: Toyota Jidosha Kabushiki Kaisha, Toyota-shi, Aichi-ken (JP)

(72) Inventors: Shinji Ichikawa, Toyota (JP); Naoya Izuno, Toyota (JP); Hiroyuki Matsuoka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/071,932

(22) Filed: Mar. 16, 2016

(65) Prior Publication Data

US 2016/0272220 A1    Sep. 22, 2016

(30) Foreign Application Priority Data

Mar. 19, 2015   (JP) ................................ 2015-056060

(51) Int. Cl.
*B60W 50/08* (2012.01)
*B60W 50/14* (2012.01)
(Continued)

(52) U.S. Cl.
CPC ............. *B60W 50/14* (2013.01); *B60K 6/445* (2013.01); *B60W 10/06* (2013.01); *B60W 10/08* (2013.01); *B60W 20/10* (2013.01);

*B60W 50/082* (2013.01); *B60K 2350/1092* (2013.01); *B60W 2050/146* (2013.01); *B60Y 2200/92* (2013.01);
(Continued)

(58) Field of Classification Search
USPC .......... 701/22, 423, 438, 455; 340/439, 438, 340/455
See application file for complete search history.

(56) References Cited

U.S. PATENT DOCUMENTS

2009/0066495 A1\*   3/2009   Newhouse ............ B60W 20/00
                                                                        340/439
2010/0052888 A1\*   3/2010   Crowe ..................... B60K 6/48
                                                                        340/461
(Continued)

FOREIGN PATENT DOCUMENTS

JP    2008-157081 A    7/2008

*Primary Examiner* — Richard Goldman
(74) *Attorney, Agent, or Firm* — Dinsmore & Shohl LLP

(57) ABSTRACT

An ECU causes a display device to display fuel efficiency when a recovery mode is selected as an operation mode in which amount-of-stored-power recovery control of making a target value of an amount of charge of a battery higher than in other modes is performed, causes the display device to display fuel efficiency when a CS mode is selected as a running mode in which the amount of charge of the battery is maintained at a prescribed target with an engine operating, and causes switching of display between fuel efficiency and electricity efficiency on the display device based on an indicator of use history of the engine when a CD mode is selected as the running mode in which running using only a motor generator with the engine stopped is given a high priority.

12 Claims, 9 Drawing Sheets

(51) Int. Cl.
*B60W 20/10* (2016.01)
*B60W 10/06* (2006.01)
*B60W 10/08* (2006.01)
*B60K 6/445* (2007.10)

(52) U.S. Cl.
CPC ....... *B60Y 2400/92* (2013.01); *Y02T 10/6239* (2013.01); *Y02T 10/6269* (2013.01); *Y02T 10/6286* (2013.01); *Y02T 10/84* (2013.01); *Y02T 10/92* (2013.01); *Y10S 903/93* (2013.01); *Y10S 903/951* (2013.01)

(56) References Cited

U.S. PATENT DOCUMENTS

| | | | |
|---|---|---|---|
| 2010/0057280 A1* | 3/2010 | Crowe | B60K 6/48 |
| | | | 701/22 |
| 2010/0182157 A1* | 7/2010 | Shaffer | H04Q 9/00 |
| | | | 340/636.13 |
| 2012/0188068 A1* | 7/2012 | Hanna | B60W 50/14 |
| | | | 340/441 |
| 2012/0272154 A1* | 10/2012 | Ichihara | G06F 9/4443 |
| | | | 715/738 |
| 2013/0027426 A1* | 1/2013 | Sasaki | B60K 35/00 |
| | | | 345/629 |
| 2014/0167944 A1* | 6/2014 | Yamaguchi | B60K 37/02 |
| | | | 340/439 |
| 2014/0350833 A1* | 11/2014 | Park | H04W 4/02 |
| | | | 701/123 |
| 2015/0183439 A1* | 7/2015 | Jackson | G01C 21/3469 |
| | | | 701/123 |
| 2016/0272220 A1* | 9/2016 | Ichikawa | B60W 50/14 |

* cited by examiner

FIG.4

| | | POWER MODE | | NORMAL MODE | | ECO MODE | | SOC RECOVERY MODE |
|---|---|---|---|---|---|---|---|---|
| CS MODE | | FUEL EFFICIENCY | | FUEL EFFICIENCY | | FUEL EFFICIENCY | | FUEL EFFICIENCY |
| EV RUNNING RATIO > DETERMINATION THRESHOLD VALUE, AND ENGINE ACTIVATED TIME < DETERMINATION THRESHOLD VALUE | | NO | YES | NO | YES | NO | YES | FUEL EFFICIENCY |
| CD MODE | | FUEL EFFICIENCY | ELECTRICITY EFFICIENCY | FUEL EFFICIENCY | ELECTRICITY EFFICIENCY | FUEL EFFICIENCY | ELECTRICITY EFFICIENCY | |

VEHICLE THAT SWITCHES BETWEEN DISPLAYING FUEL EFFICIENCY ON A DISPLAY DEVICE AND DISPLAYING ELECTRICITY EFFICIENCY ON THE DISPLAY DEVICE BASED ON ENGINE USE HISTORY WHEN A SELECTED RUNNING MODE IS A CHARGE DEPLETING MODE

This nonprovisional application is based on Japanese Patent Application No. 2015-056060 filed on Mar. 19, 2015, with the Japan Patent Office, the entire contents of which are hereby incorporated by reference.

BACKGROUND OF THE INVENTION

Field of the Invention

The present invention relates to vehicles.

Description of the Background Art

Japanese Patent Laying-Open No. 2008-157081 discloses a hybrid vehicle in which either a normal running mode or an ECO mode that gives a higher priority to fuel efficiency than in the normal running mode can be selected based on operation by an operator. This hybrid vehicle calculates fuel efficiency during running in the normal running mode and fuel efficiency during running in the ECO mode, and displays the difference between them on a display. This allows a driver to recognize an increase in energy use efficiency during the ECO mode.

SUMMARY OF THE INVENTION

The descriptions of Japanese Patent Laying-Open No. 2008-157081 are premised on HV (Hybrid Vehicle) running. In a PHV (Plug-in Hybrid Vehicle) having a battery that can be charged with electric power supplied from a power supply external to the vehicle, which has come into widespread use in recent years, a running mode of the vehicle can be switched between a CD (Charge Depleting) mode in which EV (Electric Vehicle) running is mainly employed and a CS (Charge Sustaining) mode in which HV running is mainly employed.

It is important to inform a user of fuel efficiency or electricity efficiency in a PHV. Displaying both the fuel efficiency and the electricity efficiency results in confusion for the user. It is then conceivable to display the fuel efficiency in the CS mode since HV running is mainly employed, and display the electricity efficiency in the CD mode since EV running is mainly employed. However, when a driver is driving with a great accelerator pedal position (i.e., accelerator pedal position that is greater than a prescribed pedal position X), for example, HV running is selected even in the CD mode. If the electricity efficiency is displayed even when HV running is selected, the user cannot check the fuel efficiency and may feel inconvenience.

Accordingly, an object of the present invention is to provide a vehicle capable of informing a driver of useful information about energy use efficiency.

A vehicle of the present invention includes a display device, an engine, a motor, an externally chargeable battery, and a control device that controls charge/discharge of the battery, drive of the engine, and drive of the motor, depending on a selected operation mode and a selected running mode.

The control device causes the display device to display fuel efficiency when a recovery mode is selected in which amount-of-stored-power recovery control of making a target value of an amount of charge of the battery higher than in other modes is performed. The control device causes the display device to display fuel efficiency when a CS (Charge Sustaining) mode is selected as the running mode in which the amount of charge of the battery is maintained at a prescribed target with the engine operating. The control device causes switching of display between fuel efficiency and electricity efficiency on the display device based on an indicator of use history of the engine when a CD (Charge Depleting) mode is selected as the running mode in which running using only the motor with the engine stopped is given a high priority.

Thereby, the driver can be informed of the more useful of the fuel efficiency and the electricity efficiency to the driver.

In the recovery mode, an amount of fuel (gasoline) used is increased, so the fuel efficiency useful to the user is displayed. In the CS mode, HV running using the engine to run the vehicle is mainly performed. When the engine is used, running energy is mostly provided by the use of fuel (gasoline), causing significant variation in fuel efficiency but no significant variation in electricity efficiency. Thus, the fuel efficiency useful to the driver is displayed.

In the CD mode, the more appropriate of the fuel efficiency and the electricity efficiency is displayed based on the indicator of use history of the engine. Accordingly, when the driver has been driving while frequently using the engine such as driving with a great accelerator pedal position (i.e., accelerator pedal position that is greater than a prescribed pedal position X), for example, it can be assumed that driving in which the engine tends to be used (HV running) will be conducted in the future as well. Thus, the fuel efficiency is displayed to thereby provide information useful to the user.

Preferably, when the CD mode is selected as the running mode, the control device causes the electricity efficiency to be displayed when an EV (Electric Vehicle) running ratio exceeds a first threshold value and an activated time of the engine is less than a second threshold value, and causes the fuel efficiency to be displayed when the EV running ratio is the first threshold value or less and the activated time of the engine is the second threshold value or more.

When the EV running ratio is the first threshold value or less and the activated time of the engine is the second threshold value or more, the driver has been conducting driving in which HV running tends be selected. Thus, the fuel efficiency can be displayed. When the EV running ratio exceeds the first threshold value and the activated time of the engine is less than a second threshold value, the driver has been conducting driving in which EV running tends to be selected. Thus, the electricity efficiency can be displayed.

Preferably, the control device changes the magnitudes of the first threshold value and the second threshold value depending on the selected operation mode.

Thereby, a threshold value for determining the magnitude of the engine running ratio and a threshold value for determining the magnitude of the EV running ratio are used for each operation mode, thus allowing switching of display between the fuel efficiency and the electricity efficiency at an appropriate point for each operation mode.

Preferably, when the CD mode is selected as the running mode, the control device causes the fuel efficiency to be displayed when a combination of an EV running ratio and an activated time of the engine is included in a fuel efficiency display area in a determination map, and causes the electricity efficiency to be displayed when the combination is included in an electricity efficiency display area in the determination map.

When the combination of the running ratio and the activated time of the engine is included in the fuel efficiency display area, the driver is conducting driving in which HV running tends to be selected. Thus, the fuel efficiency can be displayed. When the combination of the EV running ratio and the activated time of the engine is included in the electricity efficiency display area, the driver is conducting driving in which EV running tends to be selected. Thus, the electricity efficiency can be displayed.

Preferably, the control device changes the determination map depending on the selected operation mode.

Thereby, a determination map for determining the magnitude of the engine running ratio and the magnitude of the EV running ratio is used for each operation mode, thus allowing switching of display between the fuel efficiency and the electricity efficiency at an appropriate point for each operation mode.

Preferably, selectable operation modes include a power mode and a normal mode.

Thereby, the more appropriate of the fuel efficiency and the electricity efficiency can be displayed in consideration of the difference between the power mode and the normal mode.

Preferably, selectable operation modes include an ECO mode and a normal mode.

Thereby, the more appropriate of the fuel efficiency and the electricity efficiency can be displayed in consideration of the difference between the ECO mode and the normal mode.

Preferably, when causing the electricity efficiency to be displayed, the control device causes electricity efficiency in the selected operation mode to be displayed.

Thereby, when there is a great difference in electricity efficiency due to the difference in operation mode, the electricity efficiency in the selected operation mode can be displayed to thereby provide the driver with useful information.

Preferably, when causing the electricity efficiency to be displayed, the control device causes instantaneous electricity efficiency and average electricity efficiency to be displayed.

Thereby, when there is a difference between a way of average driving of the vehicle in the past and a way of driving of the vehicle at this point in time, the instantaneous electricity efficiency and the average electricity efficiency can be displayed to thereby provide the driver with useful information.

Preferably, when causing the fuel efficiency to be displayed, the control device causes fuel efficiency in the selected operation mode to be displayed.

Thereby, when there is a great difference in fuel efficiency due to the difference in operation mode, the fuel efficiency in the selected operation mode can be displayed to thereby provide the driver with useful information.

Preferably, when causing the fuel efficiency to be displayed, the control device causes instantaneous fuel efficiency and average fuel efficiency to be displayed.

Thereby, when there is a difference between a way of average driving of the vehicle in the past and a way of driving of the vehicle at this point in time, the instantaneous fuel efficiency and the average fuel efficiency can be displayed to thereby provide the driver with useful information.

A vehicle of the present invention includes a display device, an engine, a motor, an externally chargeable battery, and a control device that controls charge/discharge of the battery, drive of the engine, and drive of the motor, depending on a selected running mode. The control device causes switching of display between fuel efficiency and electricity efficiency on the display device based on an indicator of use history of the engine when a CD (Charge Depleting) mode is selected as the running mode in which running using only the motor with the engine stopped is given a high priority.

In the CD mode, EV running is mainly performed. When the driver has been driving while frequently using the engine, however, the fuel efficiency is displayed, which is useful to the user.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram representing factors for determining which one of electricity efficiency and fuel efficiency is to be displayed in a first embodiment.

DESCRIPTION OF THE PREFERRED EMBODIMENTS

Embodiments of the present invention will be hereinafter described with reference to the drawings.

[First Embodiment]

Figure 1:
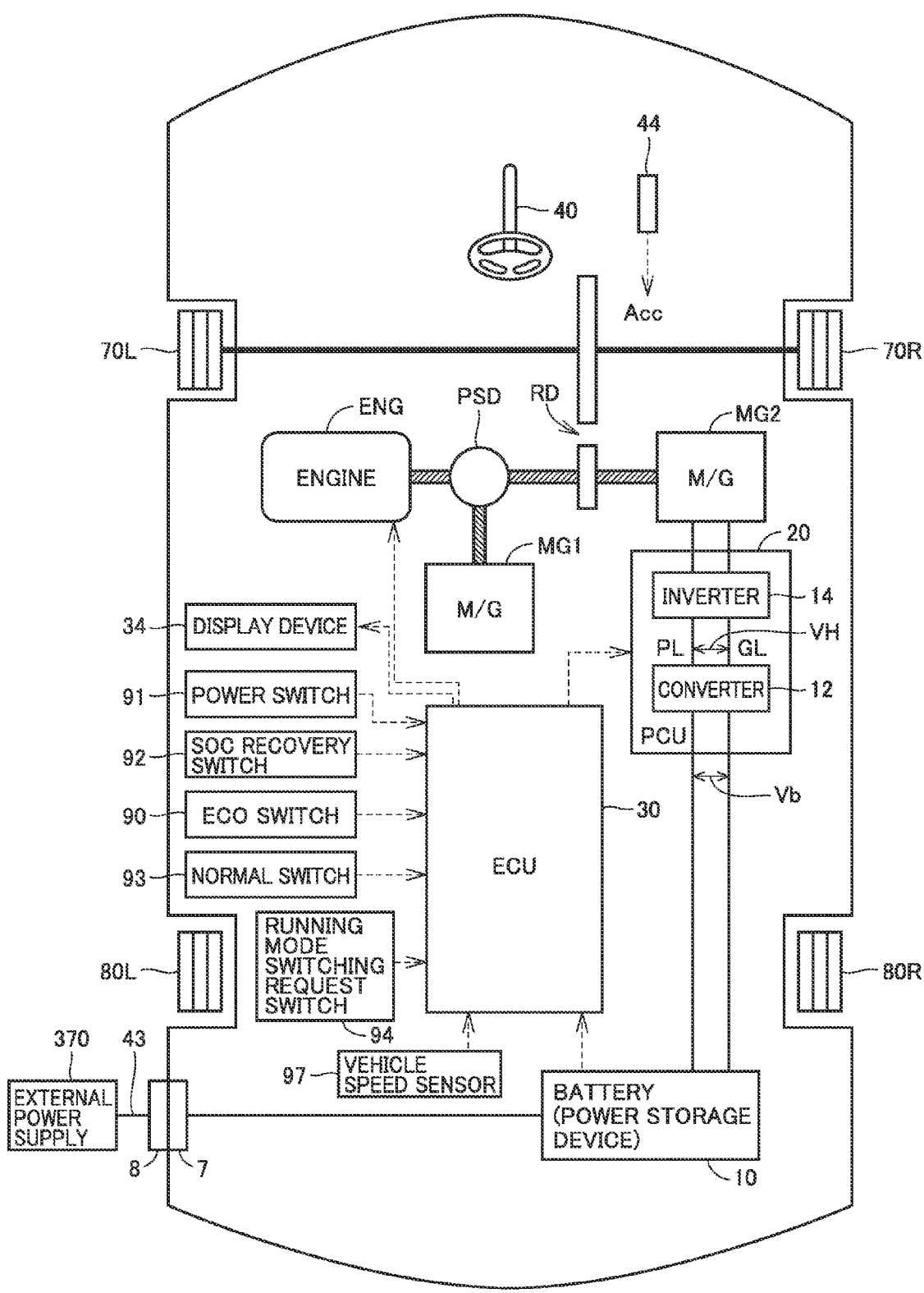
FIG. 1 is a diagram representing a configuration of a PHV in an embodiment of the present invention.

FIG. 1 is a diagram representing a configuration of a PHV in an embodiment of the present invention.

Referring to FIG. 1, a PHV 5 includes an engine ENG, motor generators MG1, MG2, a battery 10, a power control unit 20, a power split device PSD, a reduction gear RD, front wheels 70L, 70R, rear wheels 80L, 80R, an electronic control unit 30, and a display device 34. A control device according to this embodiment is implemented by, for example, a program executed by ECU 30.

A driving force generated by engine ENG is split into two paths by power split device PSD. One of the paths is for driving front wheels 70L, 70R via reduction gear RD. The other path is for driving motor generator MG1 to generate electric power.

Motor generator MG1 is typically formed of a three-phase AC synchronous electric generator. Motor generator MG1 generates electric power as a power generator by the driving force of engine ENG that has been split by power split device PSD.

The electric power generated by motor generator MG1 is used depending on an operating state of PHV 5 and an SOC (State Of Charge) of battery 10. For example, during normal running and during acceleration, the electric power generated by motor generator MG1 directly serves as motive power for driving motor generator MG2 as a motor.

This motor generator MG1 is also utilized as a starter when starting engine ENG. When starting engine ENG, motor generator MG1 is driven as an electric motor, with electric power supplied from battery 10. Motor generator MG1 then cranks and starts engine ENG.

Motor generator MG2 is typically formed of a three-phase AC synchronous electric generator. When driven as an electric motor, motor generator MG2 is driven by at least one of electric power stored in battery 10 and electric power generated by motor generator MG1. A driving force of motor generator MG2 is transmitted to front wheels 70L, 70R via reduction gear RD. Thereby, motor generator MG2 causes PHV 5 to run by assisting engine ENG, or causes PHV 5 only by the driving force of motor generator MG2.

During regenerative braking of PHV 5, motor generator MG2 is driven by front wheels 70L, 70R via reduction gear RD, and motor generator MG2 is operated as a power generator. Thereby, motor generator MG2 serves as a regenerative brake that converts regenerative energy into electrical energy. Electric power generated by motor generator MG2 is stored in battery 10 via power control unit 20.

Battery 10 is formed of a secondary battery such as a nickel-metal hydride battery or a lithium-ion battery, for example.

Power control unit 20 performs a bidirectional power conversion between DC power supplied by battery 10, and AC power controlling drive of motor generators MG1, MG2 and AC power generated by motor generators MG1, MG2.

Power control unit 20 includes a converter 12 and an inverter 14.

Converter 12 converts a DC voltage from battery 10 and outputs a DC voltage VH between a power supply line PL and a ground line GL. In addition, converter 12 is configured to be capable of performing a bidirectional voltage conversion, and converts DC voltage VH between power supply line PL and ground line GL into a charge voltage Vb for battery 10.

Inverter 14 is formed of a common three-phase inverter, and performs current control while carrying out a conversion between the direct current of battery 10 and the alternating current of motor generators MG1, MG2. Inverter 14 converts DC voltage VH between itself and converter 12 into an AC voltage, and outputs the voltage to motor generators MG1, MG2. Inverter 14 also converts an AC voltage generated by motor generators MG1, MG2 into DC voltage VH, and outputs the voltage to converter 12.

ECU 30 is electrically connected to engine ENG, power control unit 20 and battery 10. ECU 30 collectively controls an operating state of engine ENG, driven states of motor generators MG1, MG2, and the SOC of battery 10, such that PHV 5 attains a desired running state.

PHV 5 includes a running mode switching request switch 94 for setting a running mode of PHV 5.

ECU 30 selects, based on operation of running mode switching request switch 94 by the user, one of two running modes which are a CD mode that gives a high priority to running using only motor generator MG2 with engine ENG stopped, and a CS mode that maintains the SOC of battery 10 at a prescribed target with engine ENG operating, and causes PHV 5 to run in the selected running mode.

Even in the CD mode, if an accelerator pedal is substantially depressed by the driver, or during operation of an engine-driven air conditioner or during engine warm-up, operation of engine ENG is allowed. This CD mode is a running mode that basically causes the vehicle to run with the electric power stored in battery 10 as an energy source, without maintaining the SOC of battery 10. During the CD mode, it is often the case that the proportion of discharge is consequently relatively greater than that of charge.

The CS mode, on the other hand, is a running mode that generates electric power by motor generator MG1 with engine ENG operating as needed, so as to maintain the SOC of battery 10 within a prescribed range (range from 30% to 60% for example), and is not limited to running while keeping engine ENG operating.

In other words, even when the running mode is the CD mode, engine ENG operates if great vehicle power is requested by substantial depression of the accelerator pedal. Even when the running mode is the CS mode, engine ENG stops if the SOC exceeds a target value. Thus, regardless of the running mode, running using only motor generator MG2 with engine ENG stopped will be referred to as "EV running," and running using motor generator MG2 and engine ENG with engine ENG operating will be referred to as "HV running." EV running is preferentially performed in principle in the CD mode, and HV running is preferentially performed in principle in the CS mode.

PHV 5 further includes an ECO switch 90, a power switch 91, an SOC recovery switch 92, and a normal switch 93, for setting an operation mode of PHV 5.

ECO switch 90 is for the driver to select running in a fuel efficiency priority mode (ECO mode) that places importance to improvement in fuel efficiency. ECO switch 90 is electrically connected to ECU 30. ECU 30 receives an ECO switch signal Esw indicating an ON/OFF state of ECO switch 90. When this ECO switch signal Esw is ON, ECU 30 determines that the ECO mode has been selected by the driver.

Power switch 91 is for the driver to select running in a power mode that places importance to acceleration. Power switch 91 is electrically connected to ECU 30. ECU 30 receives a power switch signal Psw indicating an ON/OFF state of power switch 91. When this power switch signal Psw is ON, ECU 30 determines that the power mode has been selected by the driver.

Normal switch 93 is for the driver to select normal running. Normal switch 93 is electrically connected to ECU 30. ECU 30 receives a normal switch signal Nsw indicating an ON/OFF state of normal switch 93. When this normal switch signal Nsw is ON, ECU 30 determines that the normal mode has been selected by the driver.

ECU 30 calculates a vehicle driving force and a vehicle braking force required of PHV 5 as a whole, depending on the operation mode of PHV 5, the vehicle state of PHV 5, and the driver's operation. The vehicle state includes a vehicle speed V detected by a vehicle speed sensor 97. The driver's operation includes an accelerator pedal position Acc.

As will be described later, ECU 30 stores a table that associates a selected operation mode with a required torque to be output to a drive shaft of front wheels 70L, 70R. The required torque stored in this table is set such that a driving force provided with respect to a prescribed accelerator pedal position is higher in the power mode than in the normal mode, and is lower in the ECO mode than in the normal mode. In each operation mode, ECU 30 calculates a required torque to be output to the drive shaft of front wheels 70L, 70R based on accelerator pedal position Acc, by reference to this table. Then, ECU 30 controls the operating state of engine ENG and the driven states of motor generators MG1, MG2 such that a required driving force corresponding to this required torque is output to the drive shaft of front wheels 70L, 70R.

Figure 2:
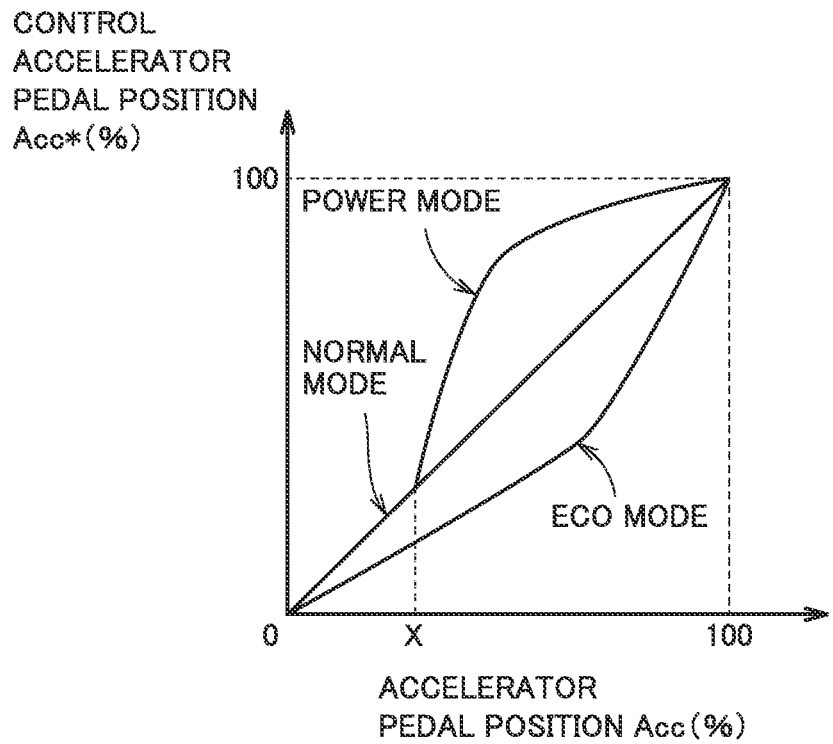
FIG. 2 is a diagram showing an example of a map for setting control accelerator pedal position.

ECU 30 sets a control accelerator pedal position Acc* based on accelerator pedal position Acc. ECU 30 previously stores relation between accelerator pedal position Acc and control accelerator pedal position Acc* as a map for setting control accelerator pedal position. Once provided with accelerator pedal position Acc from an accelerator position sensor 44, ECU 30 sets a corresponding control accelerator pedal position Acc* by reference to the stored map. FIG. 2 shows an example of the map for setting control accelerator pedal position. This drawing shows a "normal mode map" serving as a map for setting control accelerator pedal position during the normal mode, an "ECO mode map" serving as a map for setting control accelerator pedal position during the ECO mode, and a "power mode map" serving as a map for setting control accelerator pedal position during the power mode.

Referring to FIG. 2, in the normal mode map, control accelerator pedal position Acc* is set so as to have linearity with respect to accelerator pedal position Acc in a range from 0 to 100%. By contrast, in the ECO mode map, control accelerator pedal position Acc* is set so as to have nonlinearity smaller in value than control accelerator pedal position Acc* during the normal mode, so as to reduce responsivity of the torque output to the drive shaft of front wheels 70L, 70R to accelerator pedal operation. In the power mode map, the same control accelerator pedal position Acc* as control accelerator pedal position Acc* during the normal mode is set with respect to accelerator pedal position Acc in an area of a small accelerator pedal position which is a prescribed pedal position X or less, while control accelerator pedal position Acc* is set so as to have nonlinearity greater in value than control accelerator pedal position Acc* during the normal mode with respect to accelerator pedal position Acc in an area of a great accelerator pedal position which is greater than prescribed pedal position X.

When PHV 5 is set in the normal mode, ECU 30 sets control accelerator pedal position Acc* corresponding to accelerator pedal position Acc from accelerator position sensor 44, by reference to the normal mode map in FIG. 2. When PHV 5 is set in the ECO mode, ECU 30 sets control accelerator pedal position Acc* corresponding to accelerator pedal position Acc from accelerator position sensor 44, by reference to the ECO mode map in FIG. 2. When PHV 5 is set in the power mode, ECU 30 sets control accelerator pedal position Acc* corresponding to accelerator pedal position Acc from accelerator position sensor 44, by reference to the power mode map in FIG. 2.

Figure 3:
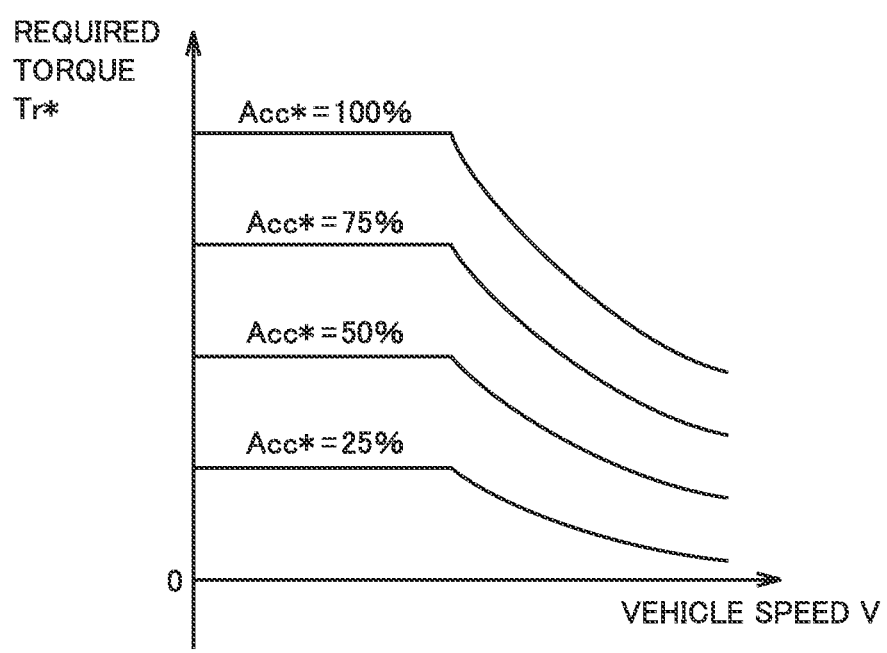
FIG. 3 is a diagram showing an example of a map for setting required torque.

Once control accelerator pedal position Acc* is thus set, ECU 30 sets, based on control accelerator pedal position Acc* thus set and vehicle speed V, a required torque Tr* to be output to the drive shaft of front wheels 70L, 70R as a torque required of PHV 5. ECU 30 previously stores relation among control accelerator pedal position Acc*, vehicle speed V and required torque Tr* as a map for setting required torque. FIG. 3 shows an example of the map for setting required torque. Once provided with control accelerator pedal position Acc* and vehicle speed V, ECU 30 sets corresponding required torque Tr* by reference to the map for setting required torque.

ECU 30 also sets, based on required torque Tr* thus set, required power Pe* required of engine ENG. It is noted that required power Pe* is set to "0" during EV running.

Then, ECU 30 determines an output request to motor generators MG1, MG2 and an output request to engine ENG so as to attain required torque Tr* and required power Pe*. It is noted that the output request to engine ENG is "0" during EV running.

In accordance with the output request to motor generators MG1, MG2, ECU 30 computes the torque and rotational speed of motor generators MG1, MG2 to generate a control command value of voltage VH.

During HV running, ECU 30 generates an engine control instruction indicating required power Pe* and a target engine speed. Fuel injection, ignition timing, valve timing and the like of engine ENG which are not shown here are controlled in accordance with this engine control instruction.

ECU 30 generates a control signal indicating driving for converting a DC voltage output from converter 12 into an AC voltage for driving motor generator MG1, and a control signal indicating regeneration for converting an AC voltage generated by motor generator MG1 into a DC voltage and returning the voltage to converter 12. These control commands for motor generator MG1 (MG1 control commands) are output to inverter 14. Similarly, ECU 30 outputs a control signal indicating driving for converting a DC voltage into an AC voltage for driving motor generator MG2, and a control signal indicating regeneration for converting an AC voltage generated by motor generator MG2 into a DC voltage and returning the voltage to converter 12. These control commands for motor generator MG2 (MG2 control commands) are output to inverter 14.

To control DC voltage VH, ECU 30 generates a control signal indicating a step-up in voltage, a control signal indicating a step-down in voltage, and a shutdown signal indicating prohibition of operation, to converter 12.

SOC recovery switch 92 is for the driver to request an increase in the amount of power stored in battery 10. SOC recovery switch 92 is electrically connected to ECU 30. ECU 30 receives a recovery switch signal Rsw indicating an ON/OFF state of SOC recovery switch 92. When this recovery switch signal Rsw is ON, ECU 30 determines that an SOC recovery mode has been selected by the driver. Even when the running mode of PHV 5 is the CD mode that gives a higher priority to consumption of the electric power of battery 10 than maintaining of the power, forced charge is performed if SOC recovery switch 92 is selected.

When the operation mode of PHV 5 is the normal mode, the power mode, or the ECO mode, ECU 30 sets a control target value of the SOC (State of Charge) of battery 10 to TG1 (60% for example) and performs charge control using engine ENG and motor generators MG1, MG2. When the operation mode of PHV 5 is the SOC recovery mode, on the other hand, ECU 30 sets the control target value of the SOC to TG2 (80% for example) higher than TG1 and performs amount-of-charge recovery control using engine ENG and motor generators MG1, MG2, so as to recover the amount of power stored in battery 10.

PHV 5 utilizes fuel (gasoline) and electric power of battery 10 as energy for running. While it is important to inform the driver of energy use efficiency, displaying both the fuel efficiency and the electricity efficiency results in confusion for the driver. In particular, when display device 34 has a small screen, displayed contents of the fuel efficiency and the electricity efficiency become smaller, resulting in difficulty of reading them by the driver. If only one of the fuel efficiency and the electricity efficiency is to be displayed, it would be more convenient to automatically select and display the more useful of the two to the driver, than allow the driver to select and display one of the two.

Since it is supposed to be useful to the driver to display the electricity efficiency in the CD mode in which EV running is mainly employed and to display the fuel efficiency in the CS mode and the SOC recovery mode in which HV running is mainly employed, this embodiment is premised on this manner of display.

However, in the CD mode, if the electricity efficiency is displayed during driving in which HV running is selected due to a great accelerator pedal position (i.e., accelerator pedal position that is greater than a prescribed pedal position X), the user cannot check the fuel efficiency and may feel inconvenience.

In this embodiment, therefore, while the aforementioned premise is basically maintained, in the CD mode, based on an indicator of use history of engine ENG of the PHV, if driving with a high proportion of EV running has been conducted, the electricity efficiency is displayed based on the assumption that driving in which EV running tends to be selected will be conducted in the future as well, and if driving with a high proportion of HV running has been conducted, the fuel efficiency is displayed based on the assumption that driving in which HV running tends to be selected will be conducted in the future as well.

In this embodiment, an activated time of engine ENG ("engine activated time" hereinafter) and an EV running ratio are used as the indicator of use history of engine ENG. This is because the proportion of HV running is high if the engine activated time is relatively long, and the proportion of EV running is high if the EV running ratio (which represents a ratio of non-use of engine ENG) is relatively high.

Specifically, in this embodiment, ECU 30 causes display device 34 to display either the fuel efficiency or the electricity efficiency as shown in FIG. 4, based on the running mode of PHV 5, the operation mode of PHV 5, the engine activated time, and the EV running ratio. Thereby, even if display device 34 has a small screen, only one of them is displayed, thus avoiding the difficulty of reading it by the driver. In addition, the more useful of the two to the driver is automatically selected and displayed, thus allowing the driver to focus on driving.

Fuel efficiency (km/L) is an amount representing a distance (km) that can be traveled per unit amount (1 L) of fuel (gasoline). Electricity efficiency (km/kWh) is an amount representing a distance (km) that can be traveled per unit energy of battery 10.

When the running mode is the CS mode, ECU 30 causes the fuel efficiency to be displayed regardless of the operation mode.

When the operation mode is the power mode, the running mode is the CD mode, the EV running ratio in the power mode is a determination threshold value for the power mode or less, and the engine activated time in the power mode is a determination threshold value for the power mode or more, ECU 30 causes the fuel efficiency to be displayed.

When the operation mode is the power mode, the running mode is the CD mode, the EV running ratio exceeds the determination threshold value for the power mode, and the engine activated time in the power mode is less than the determination threshold value for the power mode, ECU 30 causes the electricity efficiency to be displayed.

When the operation mode is the normal mode, the running mode is the CD mode, the EV running ratio in the normal mode is a determination threshold value for the normal mode or less, and the engine activated time in the normal mode is a determination threshold value for the normal mode or more, ECU 30 causes the fuel efficiency to be displayed.

When the operation mode is the normal mode, the running mode is the CD mode, the EV running ratio exceeds the determination threshold value for the normal mode, and the engine activated time in the normal mode is less than the determination threshold value for the normal mode, ECU 30 causes the electricity efficiency to be displayed.

When the operation mode is the ECO mode, the running mode is the CD mode, the EV running ratio in the ECO mode is a determination threshold value for the ECO mode or less, and the engine activated time in the ECO mode is a determination threshold value for the ECO mode or more, ECU 30 causes the fuel efficiency to be displayed.

When the operation mode is the ECO mode, the running mode is the CD mode, the EV running ratio exceeds the determination threshold value for the ECO mode, and the engine activated time in the ECO mode is less than the determination threshold value for the ECO mode, ECU 30 causes the electricity efficiency to be displayed.

The reason that the fuel efficiency is displayed when the running mode is the CD mode, the EV running ratio is the determination threshold value or less, and the engine activated time is the determination threshold value or more as described above is because the proportion of HV running selected to run PHV 5 has been high, and it can be assumed that HV running tends to be selected in the future as well. When engine ENG is used, running energy is mostly provided by the use of fuel, causing significant variation in fuel efficiency but no significant variation in electricity efficiency. It is thus considered useful to the driver to inform the driver of the fuel efficiency rather than the electricity efficiency.

The reason that the electricity efficiency is displayed when the running mode is the CD mode, the EV running ratio exceeds the determination threshold value, and the engine activated time is less than the determination threshold value is because the proportion of EV running selected to run PHV 5 has been high, and it can be assumed that EV running tends to be selected in the future as well. When engine ENG is not used, running energy is provided by the use of battery 10, causing significant variation in electricity efficiency but no variation in fuel efficiency. It is thus considered useful to the driver to inform the driver of the electricity efficiency rather than the fuel efficiency.

The reason that the fuel efficiency is displayed when the running mode is the CS mode is because HV running using engine ENG to run PHV 5 is mainly performed in the CS mode. When engine ENG is used, running energy is mostly provided by the use of fuel, causing significant variation in fuel efficiency but no significant variation in electricity efficiency. It is thus considered useful to the driver, when the CS mode is currently selected, to inform the driver of the fuel efficiency rather than the electricity efficiency. The reason that it is not determined whether to display the fuel efficiency or the electricity efficiency in accordance with the activated time of engine ENG and the EV running ratio in the past when the running mode is the CS mode, as when the running mode is the CD mode, is because nonrenewable fuel is being consumed when the CS mode is selected, and the driver should be encouraged to switch to the CD mode when the fuel efficiency is low.

When the operation mode is the SOC recovery mode, ECU 30 causes the fuel efficiency to be displayed whether the running mode is the CD mode or the CS mode. This is because, in the SOC recovery mode, the control target value for the SOC of battery 10 is high and a large amount of fuel is used, causing significant variation in fuel efficiency but no significant variation in electricity efficiency, so that it is more useful to the user to display the fuel efficiency rather than the electricity efficiency.

PHV 5 further includes an inlet 7.

Inlet 7 is a charging connector on the PHV 5 side which is connected to a connector 8 of a charging cable 43. Charging cable 43 is connected to, and transmits electric power from, an external power supply 370. The electric power received by inlet 7 is transmitted to battery 10 to charge battery 10.

Figure 5:
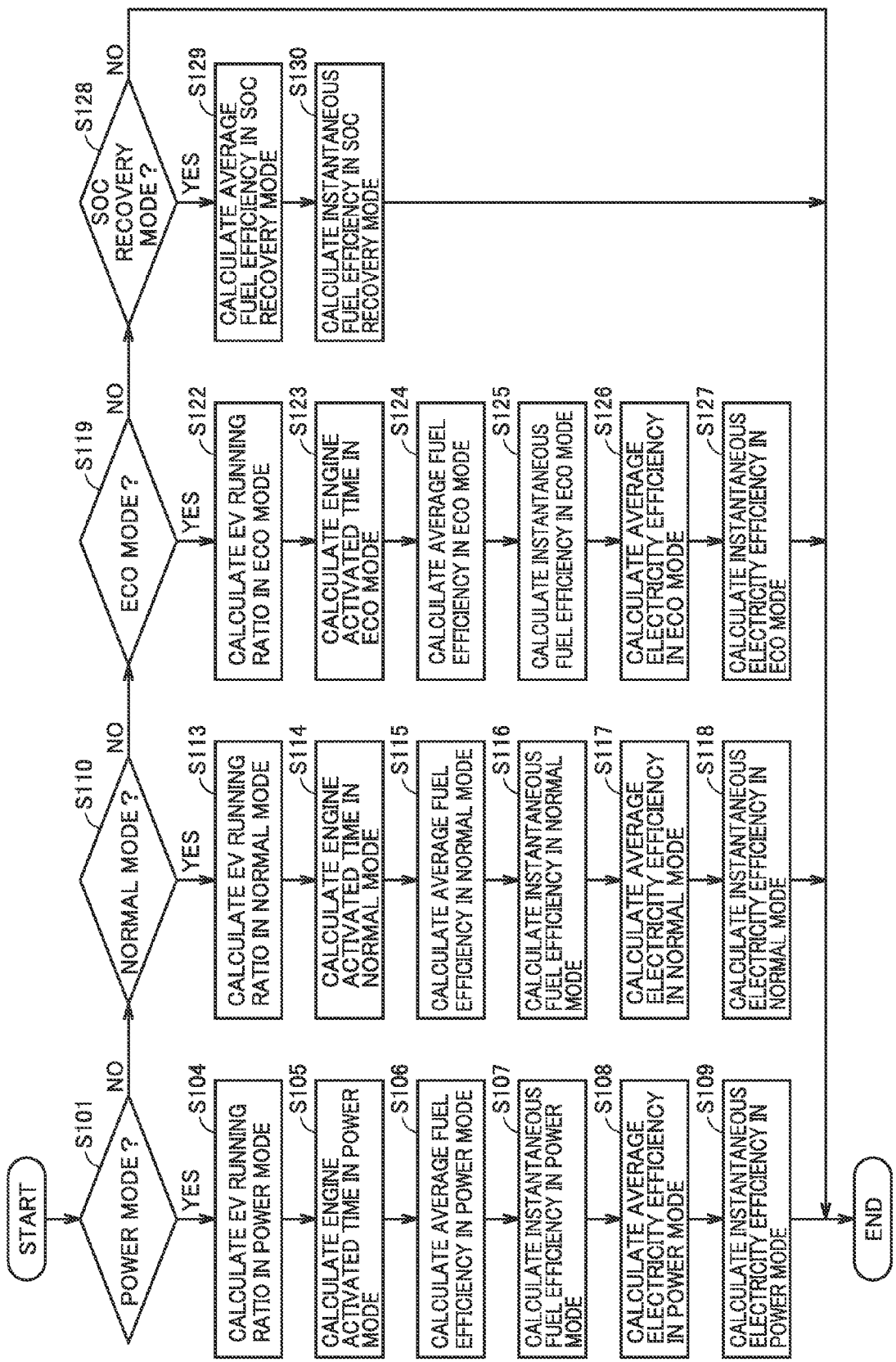
FIG. 5 is a flowchart representing a procedure of calculating an EV running ratio, an engine activated time, fuel efficiency, and electricity efficiency.

FIG. 5 is a flowchart representing a procedure of calculating the EV running ratio, the engine activated time, the fuel efficiency, and the electricity efficiency.

When the current operation mode is the power mode in step S101, the process proceeds to step S104. When the current operation mode is not the power mode, the process proceeds to step S110.

In step S104, ECU 30 calculates an EV running ratio Rp in the power mode. Specifically, ECU 30 divides a sum tp of an EV running time tpe in the power mode from system Ready-On until now and an HV running time tph in the power mode from system Ready-On until now by EV running time tpe, to provide a resultant value as EV running ratio Rp in the power mode.

In step S105, ECU 30 calculates an engine activated time Ep in the power mode. Specifically, ECU 30 calculates a time during which engine ENG is ON, namely, engine ENG is operated, in the power mode from system Ready-On until now, as engine activated time Ep.

In step S106, ECU 30 calculates average fuel efficiency MFp in the power mode. Specifically, ECU 30 divides an amount of fuel consumption in the power mode from after completion of manufacture of PHV 5 until now by a distance that has been traveled by consumption of the fuel in the power mode from after completion of manufacture of PHV 5 until now, to provide a resultant value as average fuel efficiency MFp in the power mode.

In step S107, ECU 30 calculates instantaneous fuel efficiency IFp in the power mode. Specifically, ECU 30 divides an amount of fuel consumption in the power mode from before a prescribed time until now by a distance that has been traveled by consumption of the fuel in the power mode from before the prescribed time until now, to provide a resultant value as instantaneous fuel efficiency IFp in the power mode.

In step S108, ECU 30 calculates average electricity efficiency MEp in the power mode. Specifically, ECU 30 divides an amount of consumption of the electric power of battery 10 in the power mode from after completion of manufacture of PHV 5 until now by a distance that has been traveled by consumption of the electric power of battery 10 in the power mode from after completion of manufacture of PHV 5 until now, to provide a resultant value as average electricity efficiency MEp in the power mode.

In step S109, ECU 30 calculates instantaneous electricity efficiency IEp in the power mode. Specifically, ECU 30 divides an amount of consumption of the electric power of battery 10 in the power mode from before a prescribed time until now by a distance that has been traveled by consumption of the electric power of battery 10 in the power mode from before the prescribed time until now, to provide a resultant value as instantaneous electricity efficiency IEp in the power mode.

When the current operation mode is the normal mode in step S110, the process proceeds to step S113. When the current operation mode is not the normal mode, the process proceeds to step S119.

In step S113, ECU 30 calculates an EV running ratio Rn in the normal mode. Specifically, ECU 30 divides a sum to of an EV running time tne in the normal mode from system Ready-On until now and an HV running time tnh in the normal mode from system Ready-On until now by EV running time tne, to provide a resultant value as EV running ratio Rn in the normal mode.

In step S114, ECU 30 calculates an engine activated time En in the normal mode. Specifically, ECU 30 calculates a time during which engine ENG is ON, namely, engine ENG is operated, in the normal mode from system Ready-On until now, as engine activated time En in the normal mode.

In step S115, ECU 30 calculates average fuel efficiency MFn in the normal mode. Specifically, ECU 30 divides an amount of fuel consumption in the normal mode from after completion of manufacture of PHV 5 until now by a distance that has been traveled by consumption of the fuel in the normal mode from after completion of manufacture of PHV 5 until now, to provide a resultant value as average fuel efficiency MFn in the normal mode.

In step S116, ECU 30 calculates instantaneous fuel efficiency IFn in the normal mode. Specifically, ECU 30 divides an amount of fuel consumption in the normal mode from before a prescribed time until now by a distance that has been traveled by consumption of the fuel in the normal mode from before the prescribed time until now, to provide a resultant value as instantaneous fuel efficiency IFn in the normal mode.

In step S117, ECU 30 calculates average electricity efficiency MEn in the normal mode. Specifically, ECU 30 divides an amount of consumption of the electric power of battery 10 in the normal mode from after completion of manufacture of PHV 5 until now by a distance that has been traveled by consumption of the electric power of battery 10 in the normal mode from after completion of manufacture of PHV 5 until now, to provide a resultant value as average electricity efficiency MEn in the normal mode.

In step S118, ECU 30 calculates instantaneous electricity efficiency IEn in the normal mode. Specifically, ECU 30 divides an amount of consumption of the electric power of battery 10 in the normal mode from before a prescribed time until now by a distance that has been traveled by consumption of the electric power of battery 10 in the normal mode from before the prescribed time until now, to provide a resultant value as instantaneous electricity efficiency IEn in the normal mode.

When the current operation mode is the ECO mode in step S119, the process proceeds to step S122. When the current operation mode is not the ECO mode, the process proceeds to step S128.

In step S122, ECU 30 calculates an EV running ratio Re in the ECO mode. Specifically, ECU 30 divides a sum to of an EV running time tee in the ECO mode from system Ready-On until now and an HV running time teh in the ECO mode from system Ready-On until now by EV running time tee, to provide a resultant value as EV running ratio Re in the ECO mode.

In step S123, ECU 30 calculates an engine activated time Ee in the ECO mode. Specifically, ECU 30 calculates a time during which engine ENG is ON, namely, engine ENG is operated, in the ECO mode from system Ready-On until now, as engine activated time Ee in the ECO mode.

In step S124, ECU 30 calculates average fuel efficiency MFe in the ECO mode. Specifically, ECU 30 divides an amount of fuel consumption in the ECO mode from after completion of manufacture of PHV 5 until now by a distance that has been traveled by consumption of the fuel in the ECO mode from after completion of manufacture of PHV 5 until now, to provide a resultant value as average fuel efficiency MFe in the ECO mode.

In step S125, ECU 30 calculates instantaneous fuel efficiency IFe in the ECO mode. Specifically, ECU 30 divides an amount of fuel consumption in the ECO mode from before a prescribed time until now by a distance that has been traveled by consumption of the fuel in the ECO mode from before the prescribed time until now, to provide a resultant value as instantaneous fuel efficiency IFe in the ECO mode.

In step S126, ECU 30 calculates average electricity efficiency MEe in the ECO mode. Specifically, ECU 30 divides an amount of consumption of the electric power of battery 10 in the ECO mode from after completion of manufacture of PHV 5 until now by a distance that has been traveled by consumption of the electric power of battery 10 in the ECO mode from after completion of manufacture of PHV 5 until now, to provide a resultant value as average electricity efficiency MEe in the ECO mode.

In step S127, ECU 30 calculates instantaneous electricity efficiency IEe in the ECO mode. Specifically, ECU 30 divides an amount of consumption of the electric power of battery 10 in the ECO mode from before a prescribed time until now by a distance that has been traveled by consumption of the electric power of battery 10 in the ECO mode from before the prescribed time until now, to provide a resultant value as instantaneous electricity efficiency IEe in the ECO mode.

When the current operation mode is the SOC recovery mode in step S128, the process proceeds to step S129. When the current operation mode is not the SOC recovery mode, the process ends.

In step S129, ECU 30 calculates average fuel efficiency MFs in the SOC recovery mode. Specifically, ECU 30 divides an amount of fuel consumption in the SOC recovery mode from after completion of manufacture of PHV 5 until now by a distance that has been traveled by consumption of the fuel in the SOC recovery mode from after completion of manufacture of PHV 5 until now, to provide a resultant value as average fuel efficiency MFs in the SOC recovery mode.

In step S125, ECU 30 calculates instantaneous fuel efficiency IFs in the SOC recovery mode. Specifically, ECU 30 divides an amount of fuel consumption in the SOC recovery mode from before a prescribed time until now by a distance that has been traveled by consumption of the fuel in the SOC recovery mode from before the prescribed time until now, to provide a resultant value as instantaneous fuel efficiency IFs in the SOC recovery mode.

Figure 6:
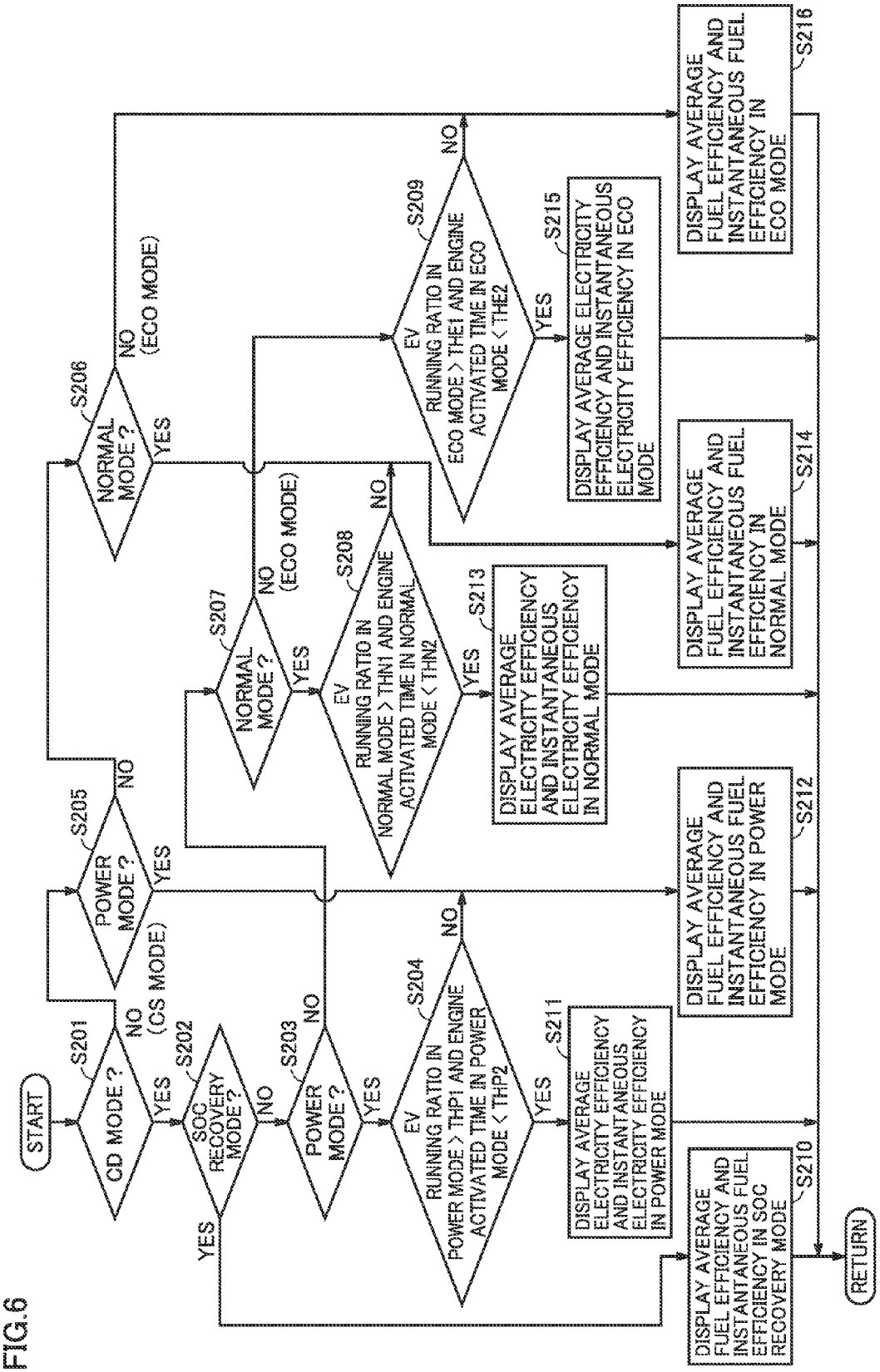
FIG. 6 is a flowchart representing a procedure of display control of fuel efficiency and electricity efficiency in the first embodiment.

FIG. 6 is a flowchart representing a procedure of display control of fuel efficiency and electricity efficiency in the first embodiment.

When the current running mode is the CD mode in step S201, the process proceeds to step S202. When the current running mode is the CS mode, the process proceeds to step S205.

When the current operation mode is the SOC recovery mode in step S202, the process proceeds to step S210. When the current operation mode is not the SOC recovery mode, the process proceeds to step S203.

When the current operation mode is the power mode in step S203, the process proceeds to step S204. When the current operation mode is not the power mode, the process proceeds to step S207.

In step S204, when EV running ratio Rp in the power mode exceeds a threshold value THP1 and engine activated time Ep in the power mode is less than a threshold value THP2, ECU 30 causes the process to proceed to step S211. When EV running ratio Rp in the power mode is threshold value THP1 or less and engine activated time Ep in the power mode is threshold value THP2 or more, ECU 30 causes the process to proceed to step S212. Here, THP1 is a predetermined value for evaluating the EV running ratio in the power mode, and is selected by ECU 30. THP2 is a predetermined value for evaluating the engine activated time in the power mode, and is selected by ECU 30.

When the current operation mode is the normal mode in step S207, the process proceeds to step S208. When the current operation mode is not the normal mode, namely, is the ECO mode, the process proceeds to step S209.

In step S208, when EV running ratio Rn in the normal mode exceeds a threshold value THN1 and engine activated time En in the normal mode is less than a threshold value THN2, ECU 30 causes the process to proceed to step S213. When EV running ratio Rn in the normal mode is threshold value THN1 or less and engine activated time En in the normal mode is threshold value THN2 or more, ECU 30 causes the process to proceed to step S214. Here, THN1 is a predetermined value for evaluating the EV running ratio in the normal mode, and is selected by ECU 30. THN2 is a predetermined value for evaluating the engine activated time in the normal mode, and is selected by ECU 30.

In step S209, when EV running ratio Re in the ECO mode exceeds a threshold value THE1 and engine activated time Ee in the ECO mode is less than a threshold value THE2, ECU 30 causes the process to proceed to step S215. When EV running ratio Re in the ECO mode is threshold value THE1 or less and engine activated time Ee in the ECO mode is threshold value THE2 or more, ECU 30 causes the process to proceed to step S216. Here, THE1 is a predetermined value for evaluating the EV running ratio in the ECO mode, and is selected by ECU 30. THE2 is a predetermined value for evaluating the engine activated time in the ECO mode, and is selected by ECU 30.

When the current operation mode is the power mode in step S205, the process proceeds to step S212. When the current operation mode is not the power mode, the process proceeds to step S206.

When the current operation mode is the normal mode in step S206, the process proceeds to step S214. When the current operation mode is not the normal mode, namely, is the ECO mode, the process proceeds to step S216.

In step S210, ECU 30 causes display device 34 to display average fuel efficiency MFs and instantaneous fuel efficiency IFs in the SOC recovery mode.

In step S211, ECU 30 causes display device 34 to display average electricity efficiency MEp and instantaneous electricity efficiency IEp in the power mode.

In step S212, ECU 30 causes display device 34 to display average fuel efficiency MFp and instantaneous fuel efficiency IFp in the power mode.

In step S213, ECU 30 causes display device 34 to display average electricity efficiency MEn and instantaneous electricity efficiency IEn in the normal mode.

In step S214, ECU 30 causes display device 34 to display average fuel efficiency MFn and instantaneous fuel efficiency IFn in the normal mode.

In step S215, ECU 30 causes display device 34 to display average electricity efficiency MEe and instantaneous electricity efficiency IEe in the ECO mode.

In step S216, ECU 30 causes display device 34 to display average fuel efficiency MFe and instantaneous fuel efficiency IFe in the ECO mode.

Figure 7:
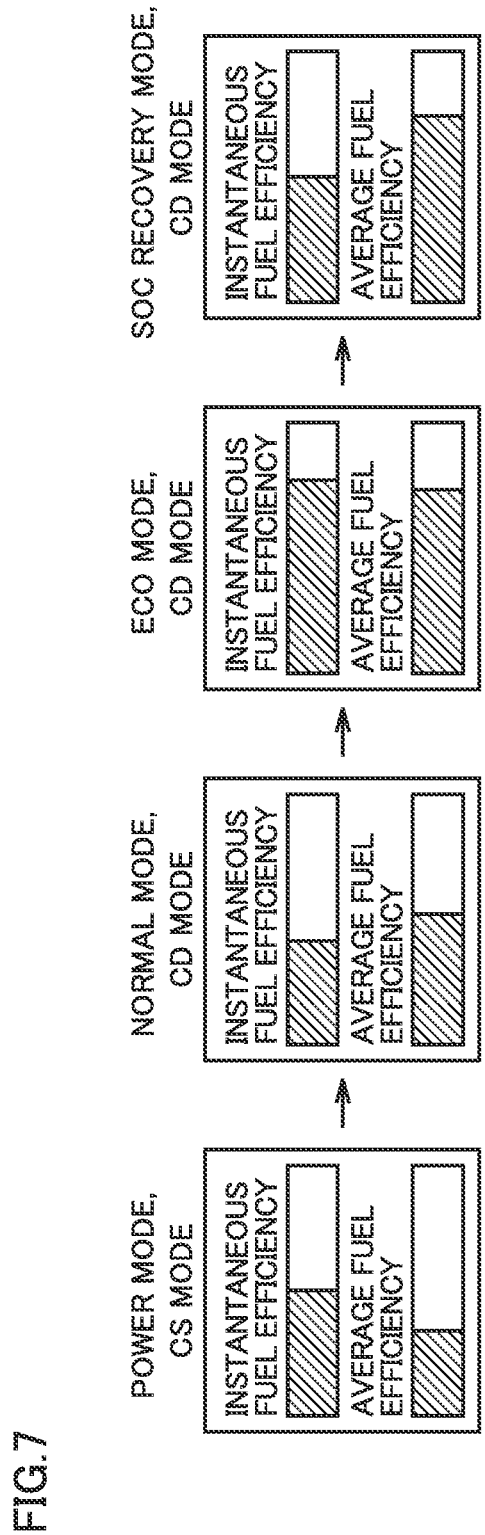
FIG. 7 is a diagram representing an example of display in the first embodiment.

FIG. 7 is a diagram representing an example of display control in the first embodiment.

When the power mode is selected as the operation mode and the CS mode is selected as the running mode, instantaneous fuel efficiency and average fuel efficiency are displayed.

Then, when the normal mode is selected as the operation mode and the CD mode is selected as the running mode, and when EV running ratio Rn in the normal mode is threshold value THN1 or less and engine activated time En in the normal mode is threshold value THN2 or more, instantaneous fuel efficiency and average fuel efficiency are displayed.

Then, when the ECO mode is selected as the operation mode and the CD mode is selected as the running mode, and when EV running ratio Re in the ECO mode is threshold value THE1 or less and engine activated time Ee in the ECO mode is threshold value THE2 or more, instantaneous fuel efficiency and average fuel efficiency are displayed.

Then, when the SOC recovery mode is selected as the operation mode and the CD mode is selected as the running mode, instantaneous fuel efficiency and average fuel efficiency are displayed.

Figure 8:
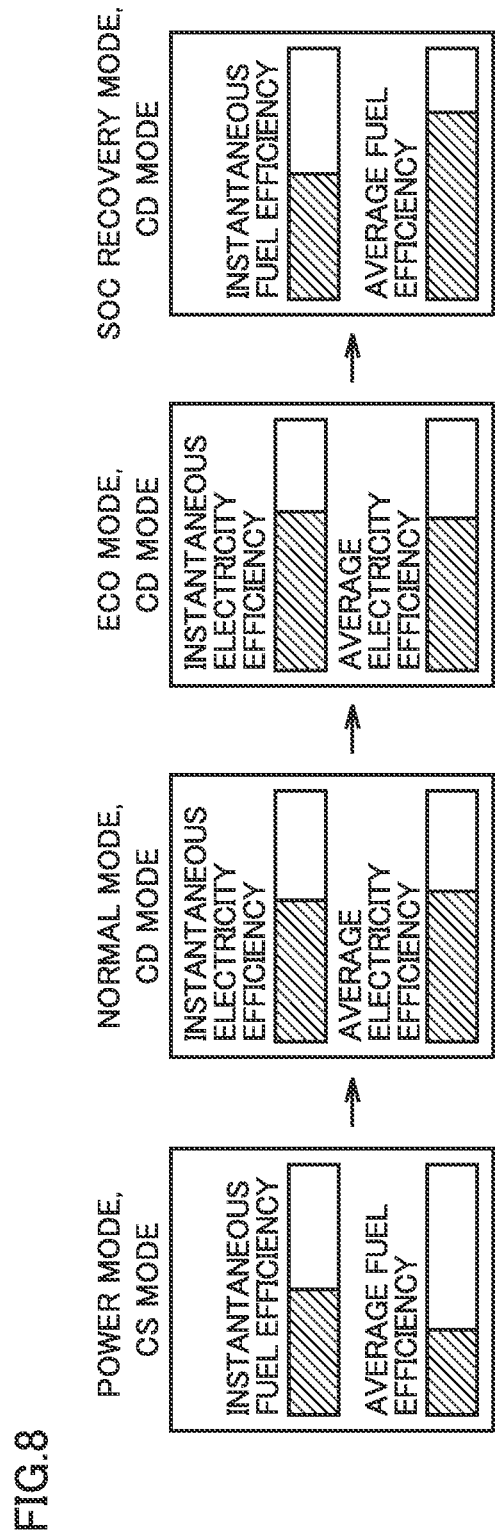
FIG. 8 is a diagram representing another example of display in the first embodiment.

FIG. 8 is a diagram representing another example of display control in the first embodiment.

When the power mode is selected as the operation mode and the CS mode is selected as the running mode, instantaneous fuel efficiency and average fuel efficiency are displayed.

Then, when the normal mode is selected as the operation mode and the CD mode is selected as the running mode, and when EV running ratio Rn in the normal mode exceeds threshold value THN1 and engine activated time En in the normal mode is less than threshold value THN2, instantaneous electricity efficiency and average electricity efficiency are displayed.

Then, when the ECO mode is selected as the operation mode and the CD mode is selected as the running mode, and when EV running ratio Re in the ECO mode exceeds threshold value THE1 and engine activated time Ee in the ECO mode is less than threshold value THE2, instantaneous electricity efficiency and average electricity efficiency are displayed.

Then, when the SOC recovery mode is selected as the operation mode and the CD mode is selected as the running mode, instantaneous fuel efficiency and average fuel efficiency are displayed.

As described above, according to this embodiment, the more useful of the electricity efficiency and the fuel efficiency to the driver can be displayed depending on the operation mode of the PHV, the running mode of the PHV, and the running conditions. According to this embodiment, when the CD mode is selected, the more useful of the electricity efficiency and the fuel efficiency to the driver can be displayed depending on whether or not the EV running ratio is less than the threshold value, and whether or not the engine activated time exceeds the threshold value.

[Second Embodiment]

In the first embodiment, ECU 30 determines which one of the electricity efficiency and the fuel efficiency is to be displayed depending on whether or not the activated time of engine ENG exceeds the determination threshold value for the current operation mode, and whether or not the EV running ratio exceeds the determination threshold value for the current operation mode.

By contrast, in the second embodiment, ECU 30 determines which one of the electricity efficiency and the fuel efficiency is to be displayed by using a determination map for each operation mode.

Figure 9:
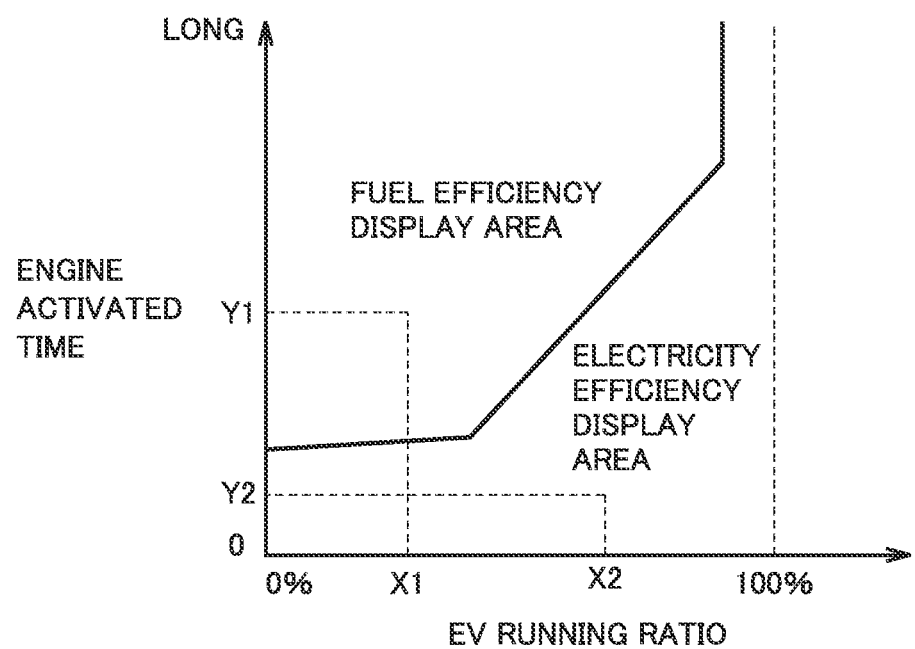
FIG. 9 is a diagram representing an example of a determination map for determining which one of electricity efficiency and fuel efficiency is to be displayed when an operation mode is a power mode in a second embodiment.

FIG. 9 is a diagram representing an example of a determination map in the power mode.

When a combination of EV running ratio Rp and engine activated time Ep in the power mode is included in an electricity efficiency display area in this determination map for the power mode, ECU 30 causes display device 34 to display the electricity efficiency. When the combination of EV running ratio Rp and engine activated time Ep in the power mode is included in a fuel efficiency display area in this determination map for the power mode, ECU 30 causes display device 34 to display the fuel efficiency.

In the determination map, except for a partial area, the fuel efficiency display area is where the EV running ratio is relatively low and the engine activated time is relatively long, and the electricity efficiency display area is where the EV running ratio is relatively high and the engine activated time is relatively short.

For example, when EV running ratio Rp in the power mode is X1 shown in FIG. 9 and engine activated time Ep is Y1 shown in FIG. 9, ECU 30 causes display device 34 to display the fuel efficiency. When EV running ratio Rp in the power mode is X2 shown in FIG. 9 and engine activated time Ep is Y2 shown in FIG. 9, ECU 30 causes display device 34 to display the electricity efficiency.

Determination maps in the normal mode and the ECO mode as the operation mode also have similar, if not the same, characteristics to those shown in FIG. 9. Using a determination map for each operation mode allows for appropriate control depending on the operation mode.

Figure 10:
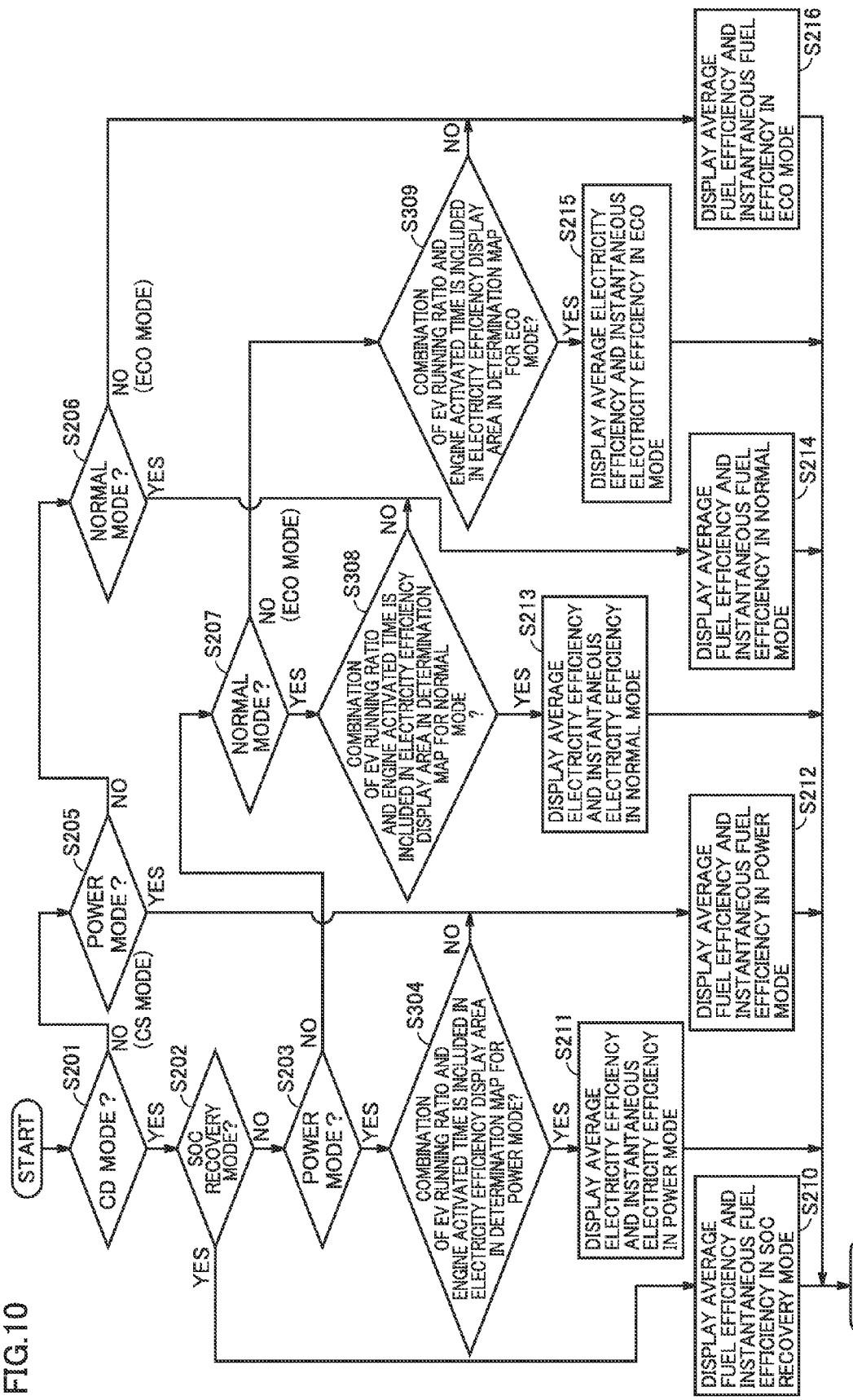
FIG. 10 is a flowchart representing a procedure of display control of fuel efficiency and electricity efficiency in the second embodiment.

FIG. 10 is a flowchart representing a procedure of display control of fuel efficiency and electricity efficiency in the second embodiment.

The flowchart of FIG. 10 is different from the flowchart of FIG. 6 in that steps S204, S208 and S209 in FIG. 6 have been replaced by steps S304, S308 and S309 in FIG. 10, respectively.

In step S304, ECU 30 selects the determination map for the power mode. When a combination of EV running ratio Rp and engine activated time Ep in the power mode is included in the electricity efficiency display area in the determination map for the power mode, ECU 30 causes the process to proceed to step S211. When the combination of EV running ratio Rp and engine activated time Ep in the power mode is included in the fuel efficiency display area in the determination map for the power mode, ECU 30 causes the process to proceed to step S212.

In step S308, ECU 30 selects the determination map for the normal mode. When a combination of EV running ratio Rn and engine activated time En in the normal mode is included in the electricity efficiency display area in the determination map for the normal mode, ECU 30 causes the process to proceed to step S213. When the combination of EV running ratio Rn and engine activated time En in the normal mode is included in the fuel efficiency display area in the determination map for the normal mode, ECU 30 causes the process to proceed to step S214.

In step S309, ECU 30 selects the determination map for the ECO mode. When a combination of EV running ratio Re and engine activated time Ee in the ECO mode is included in the electricity efficiency display area in the determination map for the ECO mode, ECU 30 causes the process to proceed to step S215. When the combination of EV running ratio Re and engine activated time Ee in the ECO mode is included in the fuel efficiency display area in the determination map for the ECO mode, ECU 30 causes the process to proceed to step S216.

As described above, according to this embodiment, the more useful of the electricity efficiency and the fuel efficiency to the driver can be displayed depending on the operation mode of the PHV, the running mode of the PHV, and the running conditions, as was in the first embodiment. According to this embodiment, when the CD mode is selected, the more useful of the electricity efficiency and the fuel efficiency to the driver can be displayed depending on where the combination of the EV running ratio and the engine activated time is located in the determination map.

(Variations)

The present invention is not limited to the embodiments described above, but also includes the following variations, for example.

(1) Average Fuel Efficiency

Although a value calculated by dividing a total amount of fuel consumption from after completion of manufacture of the PHV until now by a total distance that has been traveled by consumption of the fuel from after completion of manufacture of the PHV until now is provided as the average fuel efficiency in the embodiments, this is not restrictive. The user may reset the total amount of consumption and the total distance to 0 by operating a reset button, and restart an integration of an amount of fuel consumption and a distance that has been traveled by consumption of the fuel from that point in time. The same applies to the average electricity efficiency as well.

(2) Operation Mode

Although the driver can select one of the four operation modes of the normal mode, the power mode, the ECO mode and the SOC recovery mode in the embodiments of the present invention, the driver may be able to select one of at least two operation modes.

(3) Selection of Running Mode and Operation Mode

Although the running mode and the operation mode are selected by the driver operating the switches in the embodiments of the present invention, this is not restrictive. For example, the ECU may automatically select the running mode and the operation mode depending on the vehicle conditions, running conditions and the like.

(4) Indicator of Use History of Engine

Although the engine activated time and the EV running ratio are used as the indicator of use history of the engine in the embodiments of the present invention, only one of them may be used. In addition, an HV running ratio may be used instead of the EV running ratio.

Furthermore, although the engine activated time and the EV running ratio from system Ready-On until now are used in the embodiments of the present invention, this is not restrictive. For example, an engine activated time and an EV running ratio from before the last few hours until now, from before the last few days until now, or from after completion of manufacture of the vehicle until now, may be used.

(5) Threshold Value and Determination Map

Although the threshold value and the determination map for determining the length of the engine activated time and the magnitude of the EV running ratio vary from one operation mode to another in the embodiments of the present invention, this is not restrictive. The same threshold value and determination map may be used regardless of the difference in operation mode.

Furthermore, although the EV running ratio, the engine activated time, the average fuel efficiency, and the instantaneous fuel efficiency vary from one operation mode to another in the embodiments of the present invention, this is not restrictive. The total EV running ratio, engine activated time, average fuel efficiency, and instantaneous fuel efficiency for all operation modes may be used.

Although the embodiments of the present invention have been described above, it should be understood that the embodiments disclosed herein are illustrative and non-restrictive in every respect. The scope of the present invention is defined by the terms of the claims, and is intended to include any modifications within the scope and meaning equivalent to the terms of the claims.

What is claimed is:

1. A vehicle comprising:
  a display device;
  an engine;
  a motor;
  an externally chargeable battery; and
  a control device that controls charge/discharge of the battery, drive of the engine, and drive of the motor, depending on a selected operation mode and a selected running mode,
  the control device causing the display device to display a fuel efficiency when the selected operation mode is a recovery mode in which an amount-of-stored-power recovery control is performed to recover an amount of charge of the battery to a target value that is higher than in at least one other mode,
  the control device causing the display device to display the fuel efficiency when the selected running mode is a CS (Charge Sustaining) mode in which the amount of charge of the battery is maintained at a prescribed target with the engine operating, and
  the control device causing switching between displaying the fuel efficiency on the display device and displaying an electricity efficiency on the display device based on an indicator of use history of the engine when the selected running mode is a CD (Charge Depleting) mode in which running using only the motor with the engine stopped is given a higher priority than in another running mode.

2. The vehicle according to claim 1, wherein
  when the selected running mode is the CD mode, the control device causes the electricity efficiency to be displayed when an EV (Electric Vehicle) running ratio exceeds a first threshold value and an activated time of the engine is less than a second threshold value, and causes the fuel efficiency to be displayed when the EV running ratio is less than or equal to the first threshold value and the activated time of the engine is more than or equal to the second threshold value.

3. The vehicle according to claim 2, wherein
  the control device changes a first magnitude of the first threshold value and a second magnitude of the second threshold value depending on the selected operation mode.

4. The vehicle according to claim 1, wherein
  when the selected running mode is the CD mode, the control device causes the fuel efficiency to be displayed when a combination of an EV running ratio and an activated time of the engine is included in a fuel efficiency display area in a determination map, and causes the electricity efficiency to be displayed when the combination is included in an electricity efficiency display area in the determination map.

5. The vehicle according to claim 4, wherein
  the control device changes the determination map depending on the selected operation mode.

6. The vehicle according to claim 1, wherein
selectable operation modes include a power mode and a normal mode.

7. The vehicle according to claim 1, wherein
selectable operation modes include an ECO mode and a normal mode, wherein the ECO mode is a fuel efficiency priority mode.

8. The vehicle according to claim 1, wherein
when causing the electricity efficiency to be displayed, the control device causes an electricity efficiency in the selected operation mode to be displayed.

9. The vehicle according to claim 1, wherein
when causing the electricity efficiency to be displayed, the control device causes an instantaneous electricity efficiency and an average electricity efficiency to be displayed.

10. The vehicle according to claim 1, wherein
when causing the fuel efficiency to be displayed, the control device causes a fuel efficiency in the selected operation mode to be displayed.

11. The vehicle according to claim 1, wherein
when causing the fuel efficiency to be displayed, the control device causes an instantaneous fuel efficiency and an average fuel efficiency to be displayed.

12. A vehicle comprising:
a display device;
an engine;
a motor;
an externally chargeable battery; and
a control device that controls charge/discharge of the battery, drive of the engine, and drive of the motor, depending on a selected running mode,
the control device causing switching between displaying a fuel efficiency on the display device and displaying an electricity efficiency on the display device based on an indicator of use history of the engine when the selected running mode is a CD (Charge Depleting) mode in which running using only the motor with the engine stopped is given a higher priority than in another running mode.

* * * * *